(12) United States Patent
Charalambous et al.

(10) Patent No.: US 11,997,428 B2
(45) Date of Patent: May 28, 2024

(54) CONTROL SYSTEM AND METHOD

(71) Applicant: GORILLA TECHNOLOGY UK LIMITED, Middlesex (GB)

(72) Inventors: Christoforos Charalambous, Ledbury (GB); Odd Vidar Erik Ruben Nydren, Ledbury (GB); Henry Hyde-Thomson, Ledbury (GB); Matt Hobbs, Basingstoke (GB); Christopher Hallam, London (GB)

(73) Assignee: GORILLA TECHNOLOGY UK LIMITED, Middlesex (GB)

( * ) Notice: Subject to any disclaimer, the term of this patent is extended or adjusted under 35 U.S.C. 154(b) by 136 days.

(21) Appl. No.: 17/615,338

(22) PCT Filed: Jun. 1, 2020

(86) PCT No.: PCT/GB2020/051320
§ 371 (c)(1),
(2) Date: Nov. 30, 2021

(87) PCT Pub. No.: WO2020/240212
PCT Pub. Date: Dec. 3, 2020

(65) Prior Publication Data
US 2022/0224862 A1    Jul. 14, 2022

(30) Foreign Application Priority Data
May 30, 2019 (GB) .................................. 1907665

(51) Int. Cl.
*H04N 7/18* (2006.01)
*H04N 21/438* (2011.01)

(52) U.S. Cl.
CPC ......... *H04N 7/181* (2013.01); *H04N 21/4384* (2013.01)

(58) Field of Classification Search
None
See application file for complete search history.

(56) References Cited

U.S. PATENT DOCUMENTS

| | | | | |
|---|---|---|---|---|
| 6,809,760 | B1 * | 10/2004 | Takagi | H04N 5/77 348/207.1 |
| 7,523,482 | B2 * | 4/2009 | Barrett | H04N 21/4383 725/120 |

(Continued)

FOREIGN PATENT DOCUMENTS

| | | |
|---|---|---|
| CN | 105704446 B | 12/2018 |
| WO | 2018005835 A1 | 1/2018 |

(Continued)

OTHER PUBLICATIONS

International Search Report and Written Opinion dated Jul. 17, 2020 in corresponding application No. PCT/GB2020/051320; 10 pgs.

*Primary Examiner* — William J Kim
(74) *Attorney, Agent, or Firm* — Min-Lee Teng

(57) ABSTRACT

A system for controlling the display of at least first and second images captured by respective first and second imaging devices, the control system including one or more controllers, the control system receives a first data stream including first image data representing a first image captured by a first imaging device, receive a second data stream comprising second image data representing a second image captured by a second imaging device, process the first image data and the second image data to generate first analytics image data and second analytics image data, the first analytics image data corresponding to the first image and the second analytics image data corresponding to the second image, receive an input selecting one of the first image and the second image for display and processing the corresponding one of the first image data and the second image data to generate viewer image data.

22 Claims, 7 Drawing Sheets

(56) References Cited

U.S. PATENT DOCUMENTS

| | | | | |
|---|---|---|---|---|
| 8,174,572 B2* | 5/2012 | Buehler | ............ | G08B 13/19645 348/143 |
| 10,805,688 B1* | 10/2020 | Long | ................... | H04N 21/2221 |
| 2003/0063893 A1* | 4/2003 | Read | ......................... | H04N 5/76 386/327 |
| 2003/0095702 A1* | 5/2003 | Greiffenhagen | ........ | G06F 18/40 382/155 |
| 2003/0156027 A1* | 8/2003 | Seo | ....................... | G08B 13/191 340/691.3 |
| 2004/0194134 A1 | 9/2004 | Gunatilake et al. | | |
| 2005/0057652 A1* | 3/2005 | Tagawa | .............. | H04N 21/4223 348/E7.086 |
| 2007/0192486 A1* | 8/2007 | Wilson | .................... | H04N 7/163 348/E7.071 |
| 2007/0280298 A1* | 12/2007 | Hearn | ................. | H04N 7/17318 348/E7.071 |
| 2008/0092199 A1* | 4/2008 | McCarthy | .............. | H04N 21/25 725/35 |
| 2008/0192736 A1* | 8/2008 | Jabri | ................... | H04L 65/1063 370/352 |
| 2009/0079824 A1* | 3/2009 | Winsor | ................... | H04N 23/58 348/143 |
| 2010/0118941 A1* | 5/2010 | Taylor | ................. | H04N 21/4382 375/E7.243 |
| 2010/0150403 A1* | 6/2010 | Cavallaro | ................ | G06T 7/254 382/107 |
| 2010/0298026 A1* | 11/2010 | Goodman | ......... | H04M 1/72469 715/825 |
| 2011/0206122 A1* | 8/2011 | Lu | ......................... | H04N 19/172 375/E7.243 |
| 2011/0307913 A1* | 12/2011 | Wang | ................. | H04N 21/44224 725/9 |
| 2011/0310218 A1* | 12/2011 | Harding | ................. | H04N 23/58 348/E7.001 |
| 2012/0169882 A1* | 7/2012 | Millar | .............. | G08B 13/19608 348/E7.086 |
| 2014/0333775 A1 | 11/2014 | Naikal et al. | | |
| 2017/0171605 A1* | 6/2017 | Li | ..................... | H04N 21/47202 |
| 2019/0082216 A1* | 3/2019 | Chen | ................... | H04N 21/4383 |

FOREIGN PATENT DOCUMENTS

| | | | | |
|---|---|---|---|---|
| WO | WO-2018005835 A1 * | 1/2018 | ............ | H04N 21/235 |
| WO | WO-2018028547 A1 * | 2/2018 | ........ | H04L 29/06448 |

* cited by examiner

CONTROL SYSTEM AND METHOD

TECHNICAL FIELD

The present disclosure relates to a control system and method. Aspects of the invention relate to a control system, a surveillance system; a method, computer software and a non-transitory computer-readable storage medium.

BACKGROUND

It is known to provide a surveillance system comprising a network of video cameras. The video cameras are typically arranged in different locations on a site and arranged to capture images. The video cameras generate image data which is streamed to a control system for output. Various streaming protocols are known to compress the image data prior to transmission, for example to generate reference frame data and inter frame data which are combined to generate decoded image data. The H.264 codec is an example of a video compression protocol. An operator may request that one or more of the captured images are output to a display device, such as a display screen. In a typical system, the image may be streamed from the video camera in real-time during a continuous data stream. The operator may request that different images are output to a display device, resulting in a transition between data streams. In order to display the newly selected image, the control system must compile the image data for display. If the image stream comprises reference frame data and inter frame data, there may be a delay in compiling the newly selected image. In particular, there may be a delay until the next available reference frame data is available. The resulting system latency may prove frustrating, particularly if the operator is regularly switching between different images.

It is an aim of the present invention to address one or more of the disadvantages associated with the prior art.

SUMMARY

Aspects and embodiments of the invention provide a control system, a surveillance system; a method, computer software and a non-transitory computer-readable storage medium as claimed in the appended claims According to an aspect of the present invention there is provided a control system for controlling the display of at least first and second images captured by respective first and second imaging devices, the control system comprising one or more controllers, the control system being configured to:
receive a first data stream comprising first image data representing a first image captured by a first imaging device;
receive a second data stream comprising second image data representing a second image captured by a second imaging device;
process the first image data and the second image data to generate first analytics image data and second analytics image data, the first analytics image data corresponding to the first image and the second analytics image data corresponding to the second image;
receive an input selecting one of the first image and the second image for display and processing the corresponding one of the first image data and the second image data to generate first viewer image data or second viewer image data, the first viewer image data corresponding to the first image and the second viewer image data corresponding to the second image; and
output the first viewer image data or the second viewer image data corresponding to the selected one of the first image and the second image;
wherein the control system is configured to determine when there is a change in the first image or the second image selected for display; and, in dependence on the determination, to output the corresponding one of the first analytics image data and the second analytics image data before outputting the first viewer image data or the second viewer image data corresponding to the selected one of the first image and the second image.

When transitioning between the output of the first and second images, the control system is configured initially to output the first analytics image data or the second analytics image data to the viewer module. The first analytics image data or the second analytics image data may be output to a display device to display the selected one of the first and second images. The first viewer image data or the second viewer image data may be generated selectively. A time delay or lag may occur when the viewer module changes between outputting the first image and the second image.

The first image data may comprise first reference frame image data and first inter frame image data. Alternatively, or in addition, the second image data may comprise second reference frame image data and second inter frame image data.

The time delay or lag may be a result of the composition of the image data whereby reference frame image data is transmitted intermittently. The inter frame data represents changes to the image data, thereby reducing the total amount of image data that is transmitted. In order to form the first and second images for display, the reference frame image data and the inter frame data is compiled. By outputting the first analytics image data or the second analytics image data, the time delay or lag when changing between the first and second images may be reduced. At least in certain embodiments, the transition between the first and second images may be performed with a reduced time lag or at least substantially instantaneously.

The control system may comprise a viewer service module for selectively generating the first viewer image data and the second viewer image data. The viewer service module may be configured to decode the first image data and the second image data to generate the first viewer image data and the second viewer image data.

The first analytics image data and the second analytics image data may each be suitable for generating analytics data. The first analytics image data and the second analytics image data may each comprise decoded image data. The first analytics image data and the second analytics image data may, for example, comprise or consist of image data which is generated in dependence on reference frame image data and inter frame image data. The first analytics image data may be suitable for generating first analytics data. The second analytics image data may be suitable for generating second analytics data. The analytics data may, for example, comprise a coordinate of an object of interest or a person of interest. The coordinate may, for example, comprise a bounding box associated with the object of interest or the person of interest.

The control system may comprise an analytics service module for processing the first image data and the second image data to generate the first analytics image data and the second analytics image data. The first analytics image data may comprise first analytics service module image data. The second analytics image data may comprise second analytics service module image data. The viewer service module and the analytics service module may be operable independently of each other.

The first and second data streams may comprise additional data, for example one or more of the following: audio data; timestamp data; metadata, for example derived from analytics provided in the imaging device.

The viewer image data may be generated directly from the incoming image data received from the image capture device. The viewer image data may be generated independently of the analytics image data.

The first data stream and/or the second data stream may comprise encoded image data. The encoded image data may comprise reference frame image data and inter frame image data.

The first data stream may comprise first reference frame image data and first inter frame image data. The reference frame image data may comprise or consist of intra frame data such that the reference frame can be decoded without additional information. The inter frame image data may comprise or consist of incremental change (delta) image data. The inter frame image data may comprise P-frame data. The P-frame data may, for example, be expressed as motion vectors and transform coefficients. Alternatively, or in addition, the inter frame image data may comprise B-frame data. The B-frame data may, for example, be expressed as motion vectors and transform coefficients.

The first analytics data and the second analytics data may comprise or consist of decoded image data. The first analytics data and the second analytics data may comprise or consist of reference frame data. The first analytics data and the second analytics data may be stored, for example in a storage device. The control system may be configured to access the first analytics data and the second analytics data stored on the storage device.

The first viewer image data and the second viewer image data may be generated by decoding the first image data and the second image data respectively. A viewer service module may be provided to decode the first image data and the second image data to generate the first viewer image data and the second viewer image data. The control system may be configured to transmit the first image data and the second image data directly to the viewer service module for processing. The generation of the first analytics image data and the second analytics image data may be performed independently of the generation of the first viewer image data and the second viewer image data. The first viewer image data and the second viewer image data may be generated at least substantially in real-time.

The processing of the first image data and the second image data to generate the first analytics image data and the second analytics image data may comprise decoding the encoded image data received in the respective first and second data streams. The reference (key) frame data and the inter frame image data may be combined to generate the first analytics image data. For example, the inter frame image data may be applied to the reference frame data to generate decoded image data representing one or more intermediate image frames. The first analytics image data may comprise first decoded image data. The second analytics image data may comprise second decoded image data.

The processing of the first image data and the second image data to generate the first viewer image data or the second viewer image data may comprise decoding the encoded image data received in the corresponding one of the first and second data streams. The reference (key) frame data and the inter frame image data may be combined to generate decoded image data. For example, the inter frame image data may be applied to the reference frame data to generate decoded image data representing one or more intermediate image frames. The first viewer image data may comprise first decoded image data. The viewer image data may comprise second decoded image data.

The control system may be configured to determine when the reference frame image data will be available in the first data stream or the second data streams corresponding to the selected one of the first image and the second image. If the control system determines that the reference frame image data is available instantaneously or within a predefined time period, the control system may determine that output of the first analytics image data or the second analytics image data is not appropriate. When there is a change in the first image or the second image selected for display, the control system may directly output the first viewer image data or the second viewer image data corresponding to the selected one of the first image and the second image. If the control system determines that the reference frame image data is not available instantaneously or will not be available within the predefined time period, the control system may determine that output of the first analytics image data or the second analytics image data is appropriate. When there is a change in the first image or the second image selected for display, the control system may output the first analytics image data or the second analytics image data. The control system may transition to outputting the first viewer image data or the second viewer image data at least substantially to coincide with the reference frame image data being available.

The first analytics image data may comprise or consist of decoded image data. The second analytics image data may comprise or consist of decoded image data. The first viewer image data may comprise or consist of decoded image data. The second viewer image data may comprise or consist of decoded image data.

The first data stream may represent a first video image. The first data stream may comprise a plurality of first image frames, for example a series of second image frames. The first image frames may be consecutive or sequential to form the first video image.

The second data stream may represent a second video image. The second data stream may comprise a plurality of second image frames, for example a series of second image frames. The second image frames may be consecutive or sequential to form the second video image.

The control system may be configured initially to output the first analytics image data or the second analytics image data corresponding to the selected one of the first image and the second image. The control system may then transition to the output of the selected one of the first viewer image data and the second viewer image data.

The control system may be configured to implement a transition process when transitioning from output of the first analytics image data or the second analytics image data; to outputting the first viewer image data or the decoded second image data.

The transition process may comprise outputting the first analytics image data or the second analytics image data for an interim period of time.

The control system may be configured to generate the first analytics image data and the second analytics image data by performing a first processing operation of the first image data and the second image data respectively. The control system may be configured to generate the first viewer image data and the second viewer image data by performing a second processing operation of the first image data and the second image data respectively. The first and second processing operations may be separate from each other, for example performed as independent operations. The first and second processing operations may be performed by separate modules in the control system.

The second processing operation may be performed in respect of only one of the first image data and the second image data. The second processing operation may be performed only in respect of the one of the first image data and the second image data selected for output to the display device.

The control system may be configured to begin outputting the first viewer image data or the second viewer image data corresponding to the selected one of the first image and the second image when the second processing operation is complete.

When changing from outputting the first image to outputting the second image, the control system may be configured to output the second analytics image data and then the second viewer image data.

When changing from outputting the second image to outputting the first image, the control system may be configured to output the first analytics image data and then the first viewer image data.

The control system may be configured to generate first analytics image data and the second analytics image data at least substantially continuously. The control system may be configured to generate first analytics image data and the second analytics image data at least substantially concurrently. At least in certain embodiments, first analytics image data and the second analytics image data are persistent.

The control system may be configured to analyse at least one of the first analytics image data and the second analytics image data to identify at least one object of interest and/or at least one person of interest.

The control system may be configured to generate analytics data in dependence on the analysis of at least one of the first analytics image data and the second analytics image data.

The processor may be configured to synchronise the analytics data with the first analytics image data and/or the second analytics image data.

First analytics data may be generated in respect of each frame of the first analytics image data. Second analytics data may be generated in respect of each frame of the second analytics image data. Store the first analytics data and/or the first analytics image data in a data store. Store the second analytics data and/or the second analytics image data in a data store.

The processor may be configured to augment the first decoded image data with the first analytic data; and/or to augment the second decoded image data with the second analytic data. The augmentation may comprise displaying one or more graphical elements, for example to identify an object of interest and/or a person of interest.

The first analytics image data may comprise decoded image data. The second analytics image data may comprise decoded image data. The first decoded image data and/or the second decoded image data may represent an image constructed in dependence on reference frame image data and inter frame image data. The inter frame image data may be applied cumulatively to the previous reference frame image data to generate the current (instantaneous) decoded image data. The decoded image data may correspond to the complete field of view of the associated imaging device. Alternatively, the decoded image data may correspond to a subsection or a portion of the field of view of the associated imaging device.

According to a further aspect of the present invention there is provided a surveillance system comprising a control system as described herein; and at least first and second imaging devices configured to output first and second data streams to the control system.

According to a further aspect of the present invention there is provided a control system for controlling the display of images from a plurality of imaging devices, the control system comprising one or more controllers, the control system being configured to:
  receive a first data stream comprising first image data captured by a first imaging device and representing a first image;
  process the first image data to generate first analytics image data;
  process the first image data to generate first viewer image data; and
  selectively output either the first analytics image data or the first viewer image data to a display device.

The first image data may comprise first reference frame image data and first inter frame image data.

The reference frame image data may comprise or consist of intra frame data such that the reference frame can be decoded without additional information. The inter frame image data may comprise or consist of incremental change (delta) image data. The inter frame image data may comprise P-frame data. The P-frame data may, for example, be expressed as motion vectors and transform coefficients. Alternatively, or in addition, the inter frame image data may comprise B-frame data. The B-frame data may, for example, be expressed as motion vectors and transform coefficients.

The viewer module may be configured to output the first analytics image data until the generation of the first viewer image data is complete.

According to a further aspect of the present invention there is provided control system for controlling the display of images captured by a plurality of imaging devices, the control system comprising one or more controllers, the control system being configured to:
  receive a first data stream comprising first image data captured by a first imaging device and representing a first image;
  receive a second data stream comprising second image data captured by a second imaging device and representing a second image;
  provide an analytics module for processing the first image data and the second image data, the analytics module being configured to perform a first processing operation of the first image data and the second image data to generate first analytics image data and second analytics image data respectively; and
  provide a viewer module for selectively processing one of the first image data and the second image data and outputting a selected one of the first image and the second image to a display device;
  wherein, when one of the first image and the second image is selected for output, the control system is configured to output one of the first analytics image data and the second analytics image data corresponding to the selected one of the first image and the second image.

The first image data may comprise first reference frame image data and first inter frame image data. Alternatively, or in addition, the second image data may comprise second reference frame image data and second inter frame image data.

A transition may be implemented to change the output from one of the first and second images to outputting the other one of the first and second images.

Alternatively, or in addition, the transition may be implemented when there is a transition from outputting an image from stored image data to outputting a live image. By way of example, a user may switch from stored image data (historic data) to a live stream. The control system may also implement a switch from a live stream to accessing stored image data (historic data), but this is less problematic since the necessary data is available to compose the requested image from the stored image data. Alternatively, or in addition, the transition may be implemented when there is a transition from outputting an image from a first stored image data to a second stored image data.

According to a still aspect of the present invention there is provided a method of controlling the display of at least first and second images captured by respective first and second imaging devices, the method comprising:
  receiving a first data stream comprising first image data representing a first image captured by a first imaging device;
  receiving a second data stream comprising second image data representing a second image captured by a second imaging device;
  processing the first image data and the second image data to generate first analytics image data and second analytics image data, the first analytics image data corresponding to the first image and the second analytics image data corresponding to the second image;
  receiving an input selecting one of the first image and the second image for display and processing the corresponding one of the first image data and the second image data to generate first viewer image data or second viewer image data, the first viewer image data corresponding to the first image and the second viewer image data corresponding to the second image; and
  outputting the first viewer image data or the second viewer image data corresponding to the selected one of the first image and the second image;
  wherein the method comprises determining when there is a change in the selected one of the first image and the second image selected; and, in dependence on the determination, outputting the corresponding one of the first analytics image data and the second analytics image data before outputting the first viewer image data or the second viewer image data corresponding to the selected one of the first image and the second image.

The first image data may comprise first reference frame image data and first inter frame image data. Alternatively, or in addition, the second image data may comprise second reference frame image data and second inter frame image data.

The method may comprise initially outputting the first analytics image data or the second analytics image data corresponding to the selected one of the first image and the second image. The method may comprise transitioning to the output of the selected one of the first viewer image data and the second viewer image data.

The method may comprise performing a first processing operation of the first image data and the second image data to generate the first analytics image data and the second analytics image data respectively. A second processing operation may be performed in respect of the first image data and the second image data to generate the first viewer image data and the second viewer image data respectively. The first and second processing operations may be separate from each other. The generation of the first and second analytics image data may be performed independently of the generation of the first viewer image data and the second viewer image data.

The method may comprise initiating output of the first viewer image data or the second viewer image data corresponding to the selected one of the first image and the second image when the second processing operation is complete.

When changing from outputting the first image to outputting the second image, the method may comprise outputting the second analytics image data followed by the second viewer image data.

The method may comprise outputting the first analytics image data followed by the first viewer image data when changing from outputting the second image to outputting the first image.

The method may comprise analysing at least one of the first analytics image data and the second analytics image data to identify at least one object of interest and/or at least one person of interest.

The method may comprise generating analytics data in dependence on the analysis of at least one of the first analytics image data and the second analytics image data.

The method may comprise augmenting the first composite image data with the first analytic data; and/or augmenting the second composite image data with the second analytic data.

The first analytics image data and the second analytics image data may each be suitable for generating analytics data. The first analytics image data and the second analytics image data may each comprise decoded image data. The first analytics image data may comprise first decoded image data. The second analytics image data may comprise second decoded image data. The first analytics image data and the second analytics image data may, for example, comprise or consist of image data which is generated in dependence on reference frame image data and inter frame image data.

The method may comprise processing the first analytics image data to generate first analytics data. The method may comprise processing the second analytics image data to generate second analytics data. The first analytics data and/or the second analytics data may comprise a coordinate of an object of interest or a person of interest. The coordinate may, for example, comprise a bounding box associated with the object of interest or the person of interest.

According to a further aspect of the present invention there is provided a computer software that, when executed, is arranged to perform the method described herein.

According to a further aspect of the present invention there is provided a non-transitory, computer-readable storage medium storing instructions thereon that, when executed by one or more electronic processors, causes the one or more electronic processors to carry out the method described herein.

The term "controller," "control unit," or "computational device" may include a single controller, control unit, or computational device, and a plurality of controllers, control units, or computational devices collectively operating to provide the required control functionality.

Example controllers may comprise at least one electronic processor configured to execute electronic instructions stored within at least one memory device, which when executed causes the electronic processor(s) to carry out the method(s) described herein.

BRIEF DESCRIPTION OF THE DRAWINGS

One or more embodiments of the invention will now be described, by way of example only, with reference to the accompanying drawings, in which.

DETAILED DESCRIPTION

A control system 1 for controlling the display of a plurality of images IMG-n captured by respective imaging devices C-n in accordance with an embodiment of the present invention is described herein with reference to the accompanying Figures.

The control system 1 forms part of a surveillance/monitoring system for identifying and/or tracking an object of interest OOI and/or a person of interest POI. As described herein, the control system 1 is operable selectively to display one or more of the plurality of images IMG-n captured by the imaging devices C-n. The selected image(s) IMG-n is output to a display module 5 for viewing by an operator (not shown). The control system 1 may be provided locally, for example integrated directly to the imaging devices C-n. Alternatively, the control system 1 may be provided remotely and connected to the imaging devices C-n over a communications network, such as the internet, a Local/Wide Area Network, etc. The display module 5 is in the form of a client (or a terminal), for example operating a web browser configured to run an application for receiving and displaying the image(s) IMG-n. The image(s) IMG-n may be displayed on a display device, such as a screen or monitor.

Figure 1:
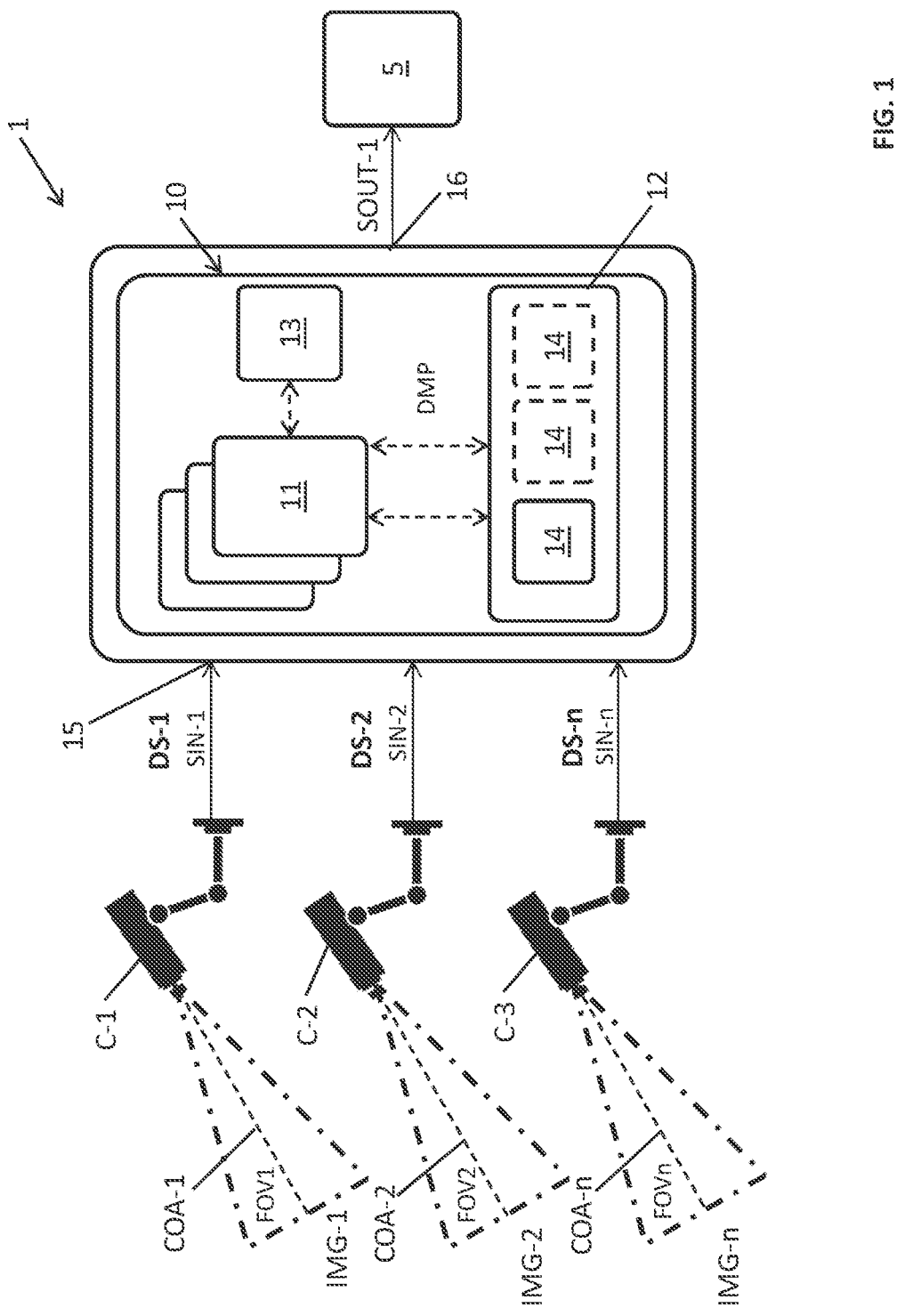
FIG. 1 shows a schematic representation of a control system for controlling the display of captured images in accordance with an embodiment of the present invention.

A schematic representation of the control system 1 is shown in FIG. 1. The control system 1 comprises one or more controllers 10 and is configured to control the display of images IMG-n. References herein to the controller 10 will be understood as including a single controller 10 and a plurality of controllers 10. The controller 10 comprises a control unit or a computational device comprising at least one electronic processor 11, a system memory 12, and at least one storage device 13. Each electronic processor 11 may, for example, comprise a microprocessor, a microcontroller, an application specific integrated circuit (ASIC), etc. A set of instructions is provided for controlling operation of the one or more controllers 10. When executed, the set of instructions cause the one or more controllers 10 to implement the control techniques described herein. The set of instructions in the present embodiment are stored in the system memory 12. In a variant, the set of instructions could be embedded in the at least one electronic processor 11. The set of instructions could optionally be provided as software for execution in the controller 10. The at least one storage device 13 in the present embodiment comprises a plurality of solid-state drives (SSD). The at least one storage device 13 may be provided locally; or may be provided in a remote location, for example a data storage facility.

In the present embodiment, the at least one electronic processor 11 comprises at least one graphical processing unit (GPU) 14. The control system 1 may comprise a single GPU 14; or may comprise a plurality of GPUs 14 which may be independent of each other or may be interconnected. The one or more GPUs 14 are arranged to form a server. It will be understood that the server may perform other functions, for example signal processing to multiplexing and/or demultiplex image data. The server may also generate and/or create viewer data to send to an image viewer client. References herein to the GPU 14 will be understood as including a single GPU 14 and a plurality of GPUs 14 collectively operating to provide the described functionality. The controller 10 is configured to process the image data in real time (or near real time) and optionally also to provide a playback function, for example to perform post-event forensic analysis. The controller 10 comprises at least one electrical input 15-n for receiving input signals SIN-n from the imaging devices C-n respectively. The input signals SIN-n comprise encoded image data DIMG-n received from each of the imaging devices C-n. The controller 10 is configured to process the encoded image data DIMG-n received from the imaging devices C-n. The controller 10 comprises at least one output 16 for outputting an output signal SOUT-n.

The imaging devices C-n are operable to monitor a site. The site may comprise one or more of the following: an interior area, for example one or more floors of a building; an exterior area, such has a parking lot, a street or compound. In certain embodiments, the site may correspond to part or all of a city, for example one or more districts or regions of a city. The control system 1 in the present embodiment is scalable, for example to cover a larger area or network. At least in certain embodiments, the site could be extended to cover at least part of a city. For example, the site may be extended to cover one or more city blocks or one or more city districts. The geospatial position of each of the imaging devices C-n is defined. In the present embodiment, the geospatial location of the imaging devices C-n is defined on a site map SM. A schematic representation of the site map SM is shown in FIG. 8. The site map SM may be defined in two dimensions, for example comprising a plan elevation of a building. The site map SM may, for example, comprise a floorplan. Alternatively, the site map SM may be defined in three dimensions, for example comprising plan and vertical elevations of the building. The geospatial location of each imaging device C-n may be defined on the site map SM. The vertical elevation of each imaging device C-n may also be defined, for example with reference to a known height of a ceiling from which the imaging device C-n is suspended. The site map SM may comprise or consist of a blueprint of a building. At least in certain embodiments, the site map SM may be output to the display module 5 for viewing.

The imaging devices C-n in the present embodiment comprise video cameras. Alternatively, or in addition, the imaging devices C-n may comprise other sensors and/or imaging systems, for example a (time-of-flight) depth camera. The imaging devices C-n operate in the visible and/or non-visible portions of the electromagnetic spectrum. For example, the imaging devices C-n may operate in the infrared spectrum for use in low-light conditions. Imaging devices C-n operating in other regions of the electromagnetic spectrum are also contemplated. The imaging devices C-n each have a field of view FOV-n in which an image scene is captured. The horizontal and vertical angular extent (angle of view) of the field of view FOV-n is dependent at least in part on the optical characteristics of the respective imaging devices C-n. One or more of the imaging devices C-n may comprise a panoramic or wide-angle lens. One or more of the imaging devices C-n may comprise a fish-eye lens providing an angle of view of 360°. The position and/or orientation of each imaging device C-n may be fixed or may be variable. For example, one or more of the imaging devices C-n may have a movable mount which may translate and/or rotate and/or pivot to adjust the position and/or orientation of the imaging device(s) C-n. The orientation of each imaging device C-n may be defined with reference to a central optical axis COA-n. The central optical axis COA-n may be defined in two-dimensions, for example using a polar coordinate system; or in three-dimensions, for example using a spherical coordinate system. When determined, the field of view FOV-n and/or the orientation of each imaging device C-n may be stored in a storage device or system memory. The field of view FOV-n and/or the central optical axis COA-n of each imaging device C-n may be represented on the site map SM. For example, the field of view FOV-n and/or the central optical axis COA-n of one or more of the imaging devices C-n may be overlaid onto the site map SM and output to the display module 5.

The imaging devices C-n are each configured to generate a data stream DS-n which is transmitted to the controller 10 in real-time (or near real-time) using an appropriate network control protocol, such as the Real Time Streaming Protocol (RTSP). The data stream from each imaging device C-n comprises encoded image data DIMG-n and is transmitted over a network comprising wired connections and/or wireless connections. To reduce bandwidth requirements, the (raw) image data is coded prior to transmission. A suitable video compression standard is H.264 (MPEG-4 Part 10, Advanced Video Coding). The (raw) image data is encoded (compressed) and the resulting encoded image data DIMG-n is transmitted to the controller 10. The encoded image data DIMG-n comprises reference frame image data DKF-n and inter frame image data DIC-n. The reference frame image data DKF-n may comprise or consist of intra frame data. The inter frame image data may comprise incremental change (delta) image data. The reference frame image data DKF-n represents a decoded image which is transmitted periodically, for example upon determination that the changes in the image are greater than a predetermined threshold or at predetermined time intervals. The inter frame image data DIC-n represents image changes and is transmitted between the reference frame image data DKF-n. The controller 10 decodes the encoded image data DIMG-n to generate decoded image data. The decoded image data represents a composite image constructed in dependence on both the reference frame image data DKF-n and the inter frame image data DIC-n. The inter frame image data DIC-n is applied cumulatively to the previous reference frame image data DKF-n to generate the current (instantaneous) decoded image data. The decoded image data may correspond to the full field of view FOV-n of the associated imaging device C-n but this is not essential. For example, the decoded image data may be generated in respect of only a subsection of the field of view FOV-n. As described herein, the controller 10 is configured to demultiplex the encoded image data DIMG-n transmitted by the imaging devices C-n to generate the decoded image data. The operation of the controller 10 will now be described in more detail. The decoded image data referenced herein is the uncompressed image data derived from the encoded image data DIMG-n.

As shown schematically in FIGS. 2 to 6, the controller 10 implements a plurality of service modules. In the present embodiment, the controller 10 implements the following service modules: a plurality of camera service modules 20-n; an analytics service module 21; a compression service module 22; a viewer service module 23; and a playback service module 24. It will be understood that there may be more than one of each of the analytics service module 21; the compression service module 22; the viewer service module 23; and the playback service module 24.

A persistent connection is maintained between the imaging devices C-n and the camera service modules 20-n. Each of the plurality of camera service modules 20-n is associated with a respective one of the imaging devices C-n. In a variant, each of the plurality of camera service modules 20-n can be associated with more than one of the imaging devices C-n. The camera service modules 20 are configured to demultiplex the data stream DS-n received from the respective imaging devices C-n. The camera service module 20-n indexes the encoded image data DIMG-n within the corresponding data stream DS-n. The indexing performed by the camera service modules 20 includes the application of a timestamp to the encoded image data DIMG-n. The timestamp may be applied by the imaging device C-n, for example when the image data is captured; or by a local time server. The camera service module stores 20 the encoded image data DIMG-n in the storage device 13.

The camera service modules 20-n output the demultiplexed encoded image data DIMG-n to the analytics service module 21. The analytics service module 21 processes the encoded image data DIMG-n to generate analytics service module image data DAN-n. The analytics service module image data DAN-n comprises or consists of decoded image data which is re-constructed in dependence on the reference frame image data DKF-n and the inter frame image data DIC-n. The decoded image data is calculated using the previous reference frame image data DKF-n and any inter frame image data DIC-n received up until to the current time. The analytics service module image data DAN-n is generated for each image (frame) IMG-n captured by each imaging device C-n. The analytics service module 21 analyses the analytics service module image data DAN-n to generate analytics data, for example to identify an object of interest OOI and/or a person of interest POI. The analytics data comprises metadata generated through analysis of the analytics service module image data DAN-n. The analytics data may comprise one or more of the following: a bounding box definition for an object of interest OOI or a person of interest POI, for example pixel coordinates of a bounding box and/or generated features.

The analytics data may be accessed in real-time, for example to perform a live tracking function of an object of interest OOI and/or a person of interest POI. The analytics data is time-stamped and stored, for example in the storage device 13. The stored analytics data may be accessed to perform post-event analysis. The analytics service module 21 may be configured to select the full image frames of interest (according to configuration files for each imaging device C-n, independent of the frames-per-second (FPS) capture rate of the imaging device C-n) which are then used for analysis. By analysing the full image frames in an FPS-independent manner, the analytics service module 21 may analyse the input data at a frame rate which is different from the original FPS capture rate of the imaging device C-n. For example, the analytics service module 21 may discard some frames of the image data captured by one or more of the imaging devices C-n. Alternatively, or in addition, different sets of image data may be processed at different FPS rates.

The compression service module 22 is configured to perform high quality compression, for example, to speed up loading/unloading of the GPU 14. The compression service module 22 may compress the image data generated by the viewer service module 23, for example prior to transmission to the viewer 24 (which may located remotely). The compression service module 22 may help to reduce or minimise latency/lag. The compression service module 22 could be implemented in a communication channel, for example between any pair of modules in the controller 10. compression service module 22.

The viewer service module 23 is configured to process the encoded image data DIMG-n to generate viewer image data DVW-n for output to a viewer 24. The viewer service module 23 is configured to transcode the encoded image data DIMG-n into a protocol for streaming. The viewer 24 is configured to output the viewer image data DVW-n to display the selected image IMG-n. The viewer 24 may, for example, be implemented within a web client displayed on the display module 5. At least one of the images IMG-n is selected for output to the viewer 24. The selection may be made in dependence on a user input, for example via a human machine interface (HMI). The operator may select one or more of the imaging device(s) C-n and the corresponding image IMG-n selected for display. The operator may, for example, select one or more imaging devices C-n in a particular location on the site map SM and/or having a particular orientation. The one or more imaging devices C-n may, for example, be selected using a graphical representation of the site map SM overlaid with the geospatial location of the imaging devices C-n and optionally also their respective fields of view FOV-n. The controller 10 is configured to select the encoded image data DIMG-n corresponding to the selected image(s) IMG-n. Alternatively, or in addition, the selection of the image IMG-n may be performed automatically. For example, the analytics service module 21 may select the image(s) IMG-n in dependence on a determination by the analytics service module 21 that the image(s) comprises an object of interest OOI and/or a person of interest POI. The corresponding encoded image data DIMG-n may be identified and transmitted from the imaging device IMG-n directly to the viewer service module 23. The viewer service module 23 processes the encoded image data DIMG-n and generates the viewer image data DVW-n. The viewer image data DVW-n is decoded image data and provides a complete, up-to-date representation of the selected image IMG-n. The viewer image data DVW-n is output to the viewer 24.

The viewer image data DVW-n is generated in dependence on the reference frame image data DKF-n and the inter frame image data DIC-n. Upon selection of the encoded image data DIMG-n, the viewer image data DVW-n may be updated only when the next available reference frame image data DKF-n is received by the viewer service module 23. When there is a change in the image IMG-n to be displayed, there may be a delay before the selected encoded image data DIMG-n is available for output to the viewer 24. To reduce or avoid this latency, the controller 10 is configured to access the analytics service module image data DAN-n generated by the analytics service module 21. The analytics service module image data DAN-n is processed by the viewer service module 23 to generate the viewer image data DVW-n which is output to the viewer 24. The analytics service module image data DAN-n thereby provides an alternate means for generating the selected image IMG-n at least for the time interval when the encoded image data DIMG-n received from the camera service module 20-*n* cannot be used to compose a decoded image. In the present embodiment, the viewer service module 23 is configured to determine when the image IMG-n selected for display has changed. In dependence on the determination, the viewer service module 23 is configured to access the analytics service module image data DAN-n corresponding to the newly selected image IMG-n. The viewer service module 23 processes the analytics service module image data DAN-n to generate viewer image data DVW-n which is output to the viewer 24. The viewer service module 23 continues to process the analytics service module image data DAN-n until the next reference frame image data DKF-n is available directly from the camera service module 20. Upon determining that the next reference frame image data DKF-n is available, the viewer service module 23 then changes from generating the viewer image data DVW-n in dependence on the analytics service module image data DAN-n to generating the viewer image data DVW-n in dependence on the encoded image data DIMG-n from the camera service module 20-*n*.

The operation of the controller 10 will now be described with reference to FIGS. 2 to 6. The controller 10 is connected to a plurality of imaging devices C-n. The control system 1 maintains persistent connections between each of the first and second imaging devices C-1, C-2 and the controller 10. By maintaining a persistent connection, latency caused by switching on/off connections between the controller 10 and the imaging devices C-n may be reduced or eliminated. For the sake of brevity, the operation of the controller 10 will be described with reference to a first imaging device C-1 and a second imaging device C-2. It will be understood that the same techniques may be applied for additional imaging devices C-n.

Figure 2:
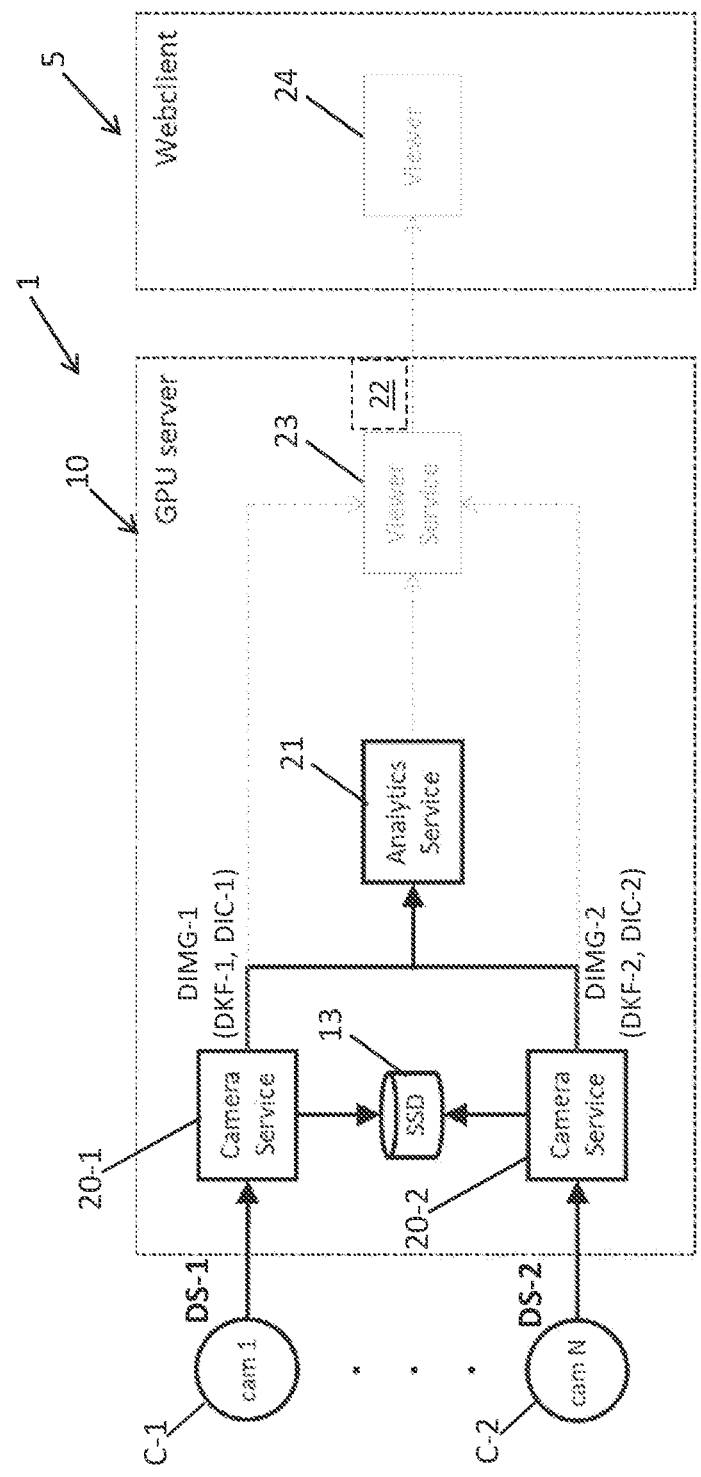
FIG. 2 shows a schematic representation of the control system operating in a background mode to analyse first and second image data.

The controller 10 is illustrated in FIG. 2 operating in a background mode in which the first and second imaging devices C-1, C-2 continuously transmit first and second data streams DS-1, DS-2 to the first and second camera service modules 20-1, 20-2. The first and second camera service modules 20-1, 20-2 demultiplex the first and second data streams DS-1, DS-2 to generate first and second encoded image data DIMG-1, DIMG-2. The first and second encoded image data DIMG-1, DIMG-2 is indexed and written to the storage device 13. The first and second encoded image data DIMG-1, DIMG-2 is stored for a configurable amount of time, to allow (on demand) playback of the first or second image IMG-1, IMG-2 captured by the first and second imaging devices C-1, C-2 during the configured time period. The first and second encoded image data DIMG-1, DIMG-2 is output to the analytics service module 21. The analytics service module 21 analyses the first and second encoded image data DIMG-1, DIMG-2 and generates first and second analytics service module image data DAN-1, DAN-2. The analytics service module 21 may, for example, identify an object of interest OOI and/or a person of interest POI in one or more of the first and second analytics service module image data DAN-1, DAN-2. The analytics service module 21 generates analytics data, for example comprising time and/or location data. The analytics data may be stored, for example to facilitate post-event analysis.

Figure 3:
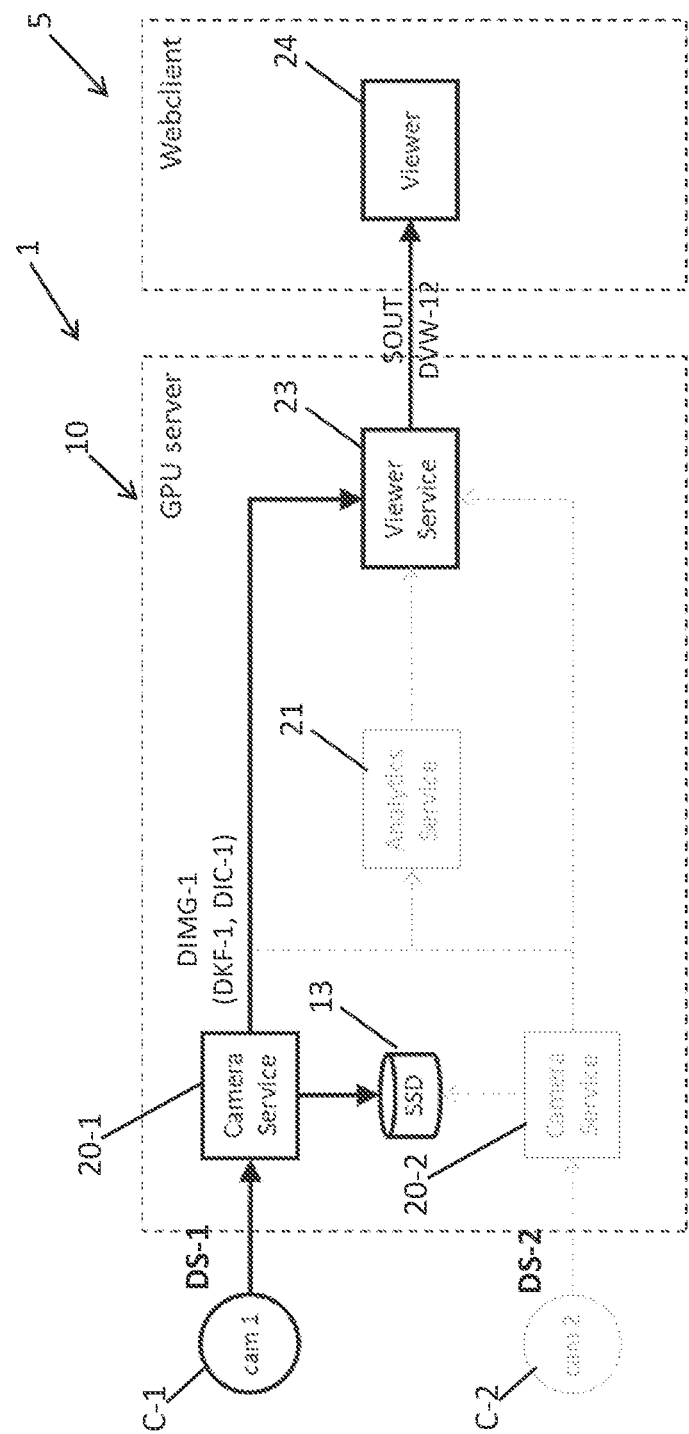
FIG. 3 shows a schematic representation of the control system configured to output a first image.
Figure 4:
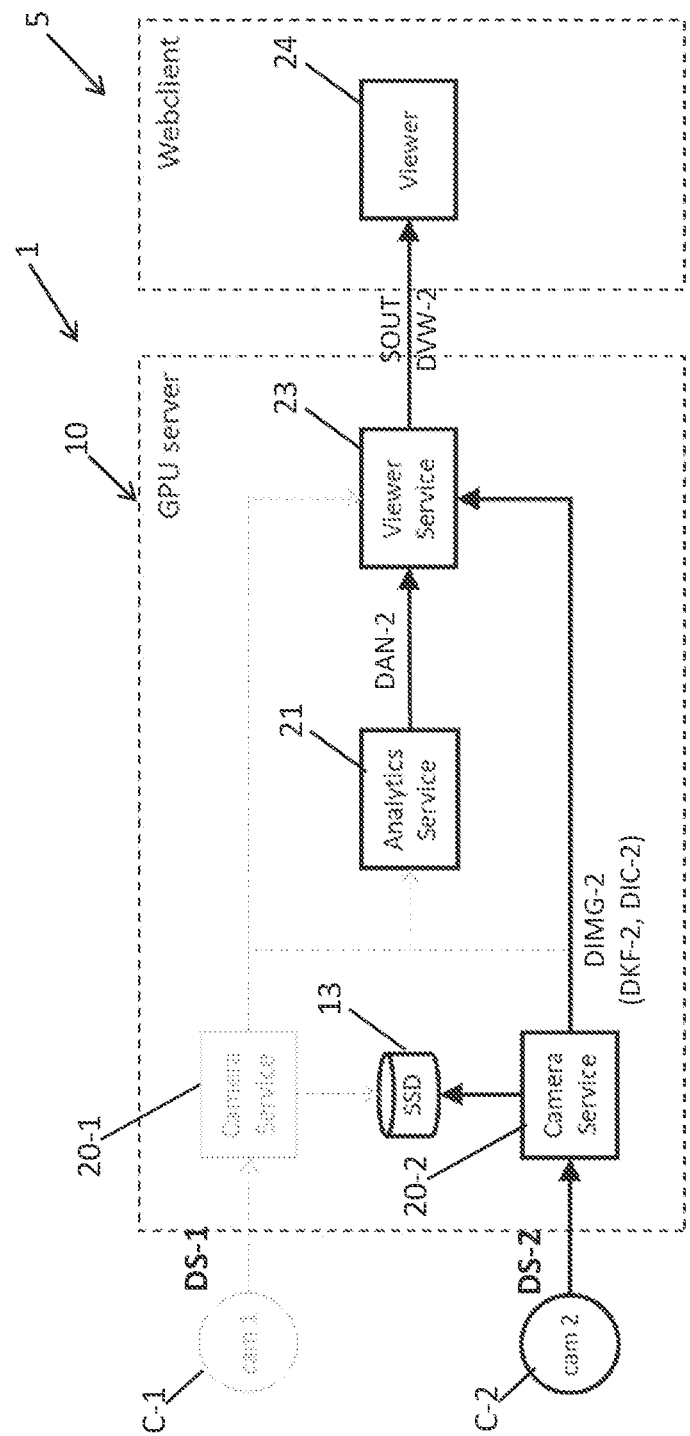
FIG. 4 shows a schematic representation of the control system transitioning from the output of the first image to outputting a second image.

The controller 10 is operable in a live streaming mode, as illustrated in FIG. 3. The first image IMG-1 captured by the first imaging device C-1 is output to the display module 5 for viewing at least substantially in real-time. The first imaging device C-1 transmits the first data stream DS-1 to the first camera service module 20-1. The first camera service module 20-1 demultiplexes the first data stream DS-1 and writes the first encoded image data DIMG-1 to the storage device 13. The first encoded image data DIMG-1 is transmitted directly to the viewer service module 23. The viewer service module 23 processes the first encoded image data DIMG-1 and generates first viewer image data DVW-1 which is output to the viewer 24. An operator may view the first image IMG-1 captured by the first imaging device C-1 in real time. Although not illustrated in FIG. 3, the analytics service module 21 continues to process the second encoded image data DIMG-2 while the viewer service module 23 generates the first viewer image data DVW-1. The second imaging device C-2 has a persistent (open) connection with the controller 10 and a continuous connection is established with the second camera service module 20-2. The second camera service module 20-2 demultiplexes the incoming second data stream DS-2 and extracts the second encoded image data DIMG-2. The second encoded image data DIMG-2 is stored in the storage device 13. The second encoded image data DIMG-2 is also processed by the analytics service module 21 to generate second analytics service module image data DAN-2. The second analytics service module image data DAN-2 is generated continuously and represents decoded image data. The analysis of the first and second encoded image data DIMG-1, DIMG-2 is performed in parallel by the analytics service module 21.

The control system 1 can be reconfigured to output the second image IMG-2 captured by the second imaging device C-2 in place of the first image IMG-1 captured by the first imaging device C-1. The change may occur in dependence on a user input, for example an operator request to change the image IMG-n to be displayed. The transition implemented by the controller to change from displaying the first image IMG-1 to streaming of the second image IMG-2 is illustrated in in FIG. 4. Upon determining that the operator has requested that the second image IMG-2 is output, the controller 10 initiates reading of the second analytics service module image data DAN-2 generated by the analytics service module 21. The second analytics service module image data DAN-2 is transmitted to the viewer service module 22 and processed to generate second viewer image data DVW-2. The second viewer image data DVW-2 is output to the viewer 24 for display on the display module 5.

Figure 5:
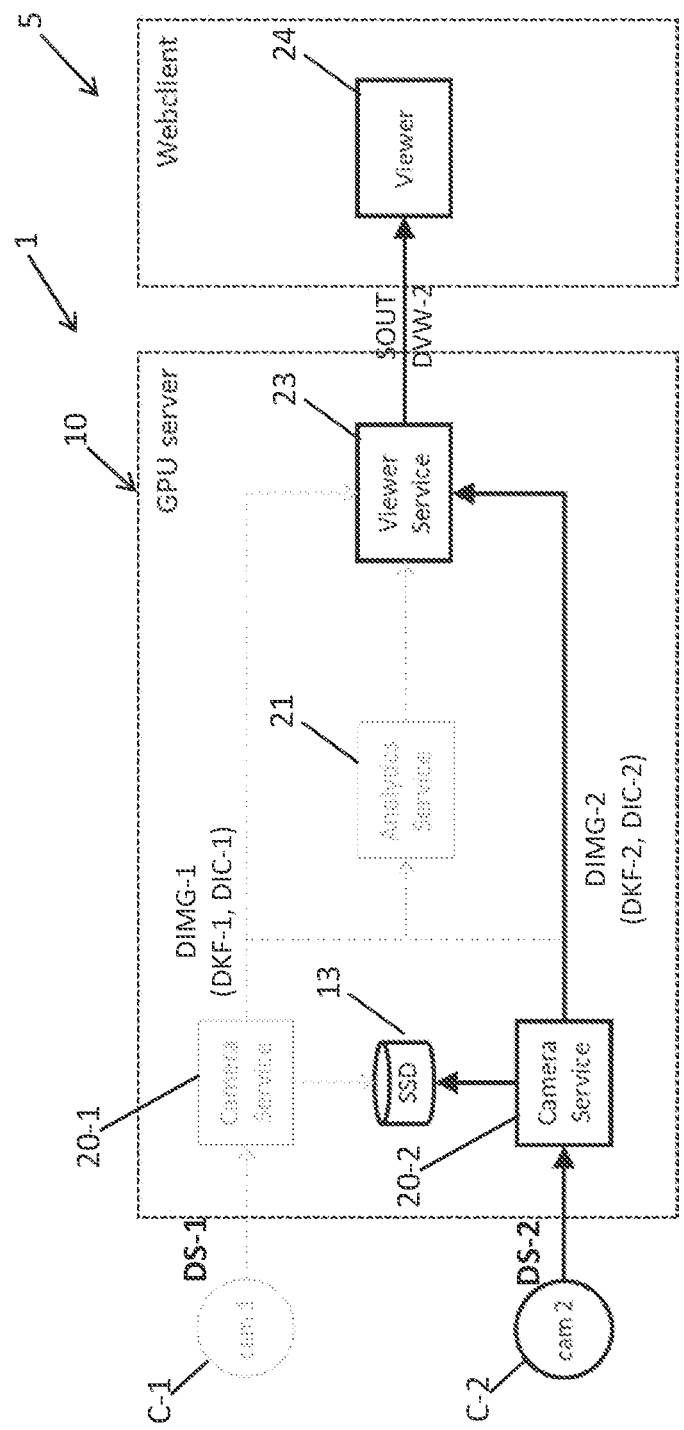
FIG. 5 shows a schematic representation of the control system configured to output the second image.
Figure 6:
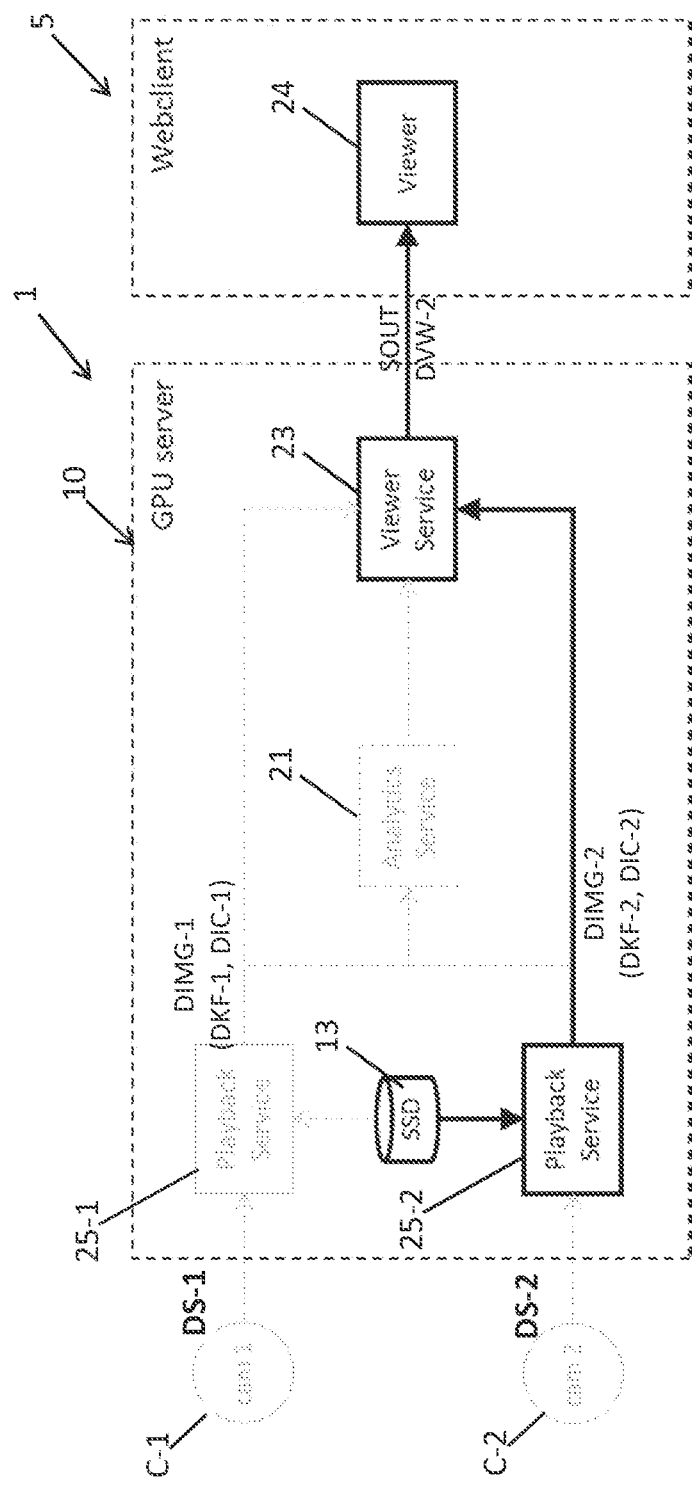
FIG. 6 shows a schematic representation of the control system configured to operate in a playback mode to output image data from a data store.

The controller 10 continues to monitor the second encoded image data DIMG-2 to determine when the next available reference frame image data DKF-n is available in the second data stream DS-2. As soon as the next reference frame image data DKF-n is available, the viewer service module 23 switches from reading the second analytics service module image data DAN-2 to reading the second encoded image data DIMG-2 received directly from the second camera service module 20-2. The switched arrangement is shown in FIG. 5 in which the second camera service module 20-2 outputs the second encoded image data DIMG-2 directly to the viewer service module 23. The viewer service module 23 receives the second encoded image data DIMG-2 and generates second viewer image data for output to the viewer 24 (on the operator's client).

Figure 7:
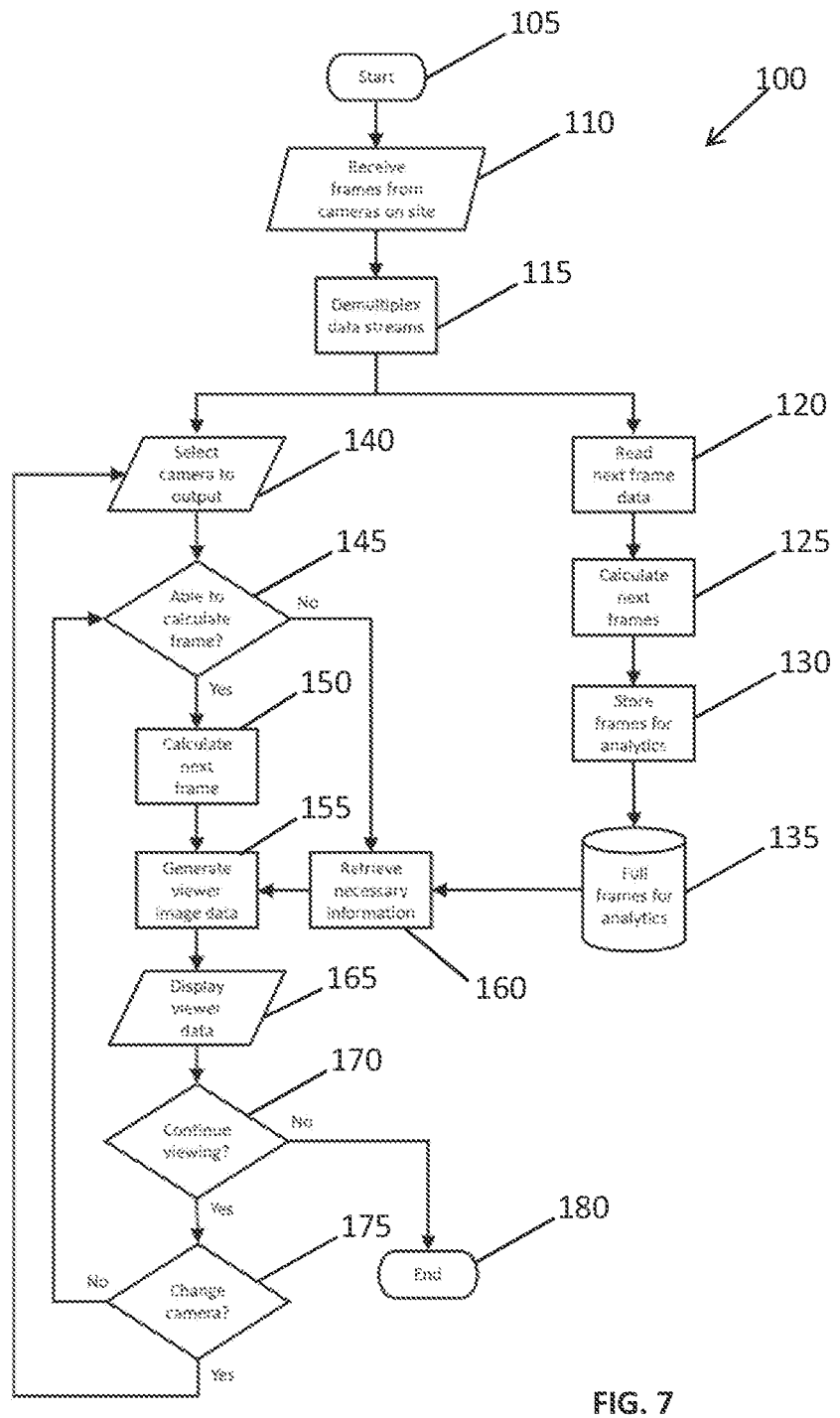
FIG. 7 shows a first block diagram illustrating operation of the control system to switch between images captured by first and second imaging devices.

A first block diagram 100 showing operation of the controller 10 when switching between the output of the first image IMG-1 and the second image IMG-2 is shown in FIG. 7. The process is initiated (BLOCK 105). The images IMG-n from all available imaging devices C-n are captured (BLOCK 110). The data stream from each imaging device C-n is demultiplexed (BLOCK 115). The analytics service module 21 receives the demultiplexed stream data, containing the reference frame image data DKF-n and the inter frame image data DIC-n (BLOCK 120). The analytics service module 21 stores the reference image data DKF-n and inter frame image data DIC-n required to decode the following frames. The analytics service module 21 may, for example, store the last available reference image data DKF-n and the current inter frame image data DIC-n; or the last available reference image data DKF-n and the subsequent inter frame image data DIC-n. The analytics service module 21 processes the reference frame image data DKF-n and the inter frame image data DIC-n to generate the decoded image data for the analytics service module image data DAN-n (BLOCK 125). The analytics service module image data DAN-n comprises decoded image data which is stored for analysis (BLOCK 130) on a storage device (BLOCK 135). A persistent connection is maintained between the analytics service module 21 and each of the imaging devices C-n. The analytics service module image data DAN-n is thereby generated and maintained in respect of each of the imaging devices C-n.

The viewer service module 23 operates in parallel with the analytics service module 21 to process at least one of the images IMG-n for output to the display screen 5. A user selects one of the imaging devices C-n for viewing. In dependence on the user selection, the viewer service module 23 initiates a switch to the selected imaging device C-n (BLOCK 140). By way of example, the user may switch from the first imaging device C-1 to the second imaging device C-2. The controller 10 switches from reading the first image data DIMG-1 from the first camera service module 20-1 to reading the second image data DIMG-2 from the second camera service module 20-2. The controller 10 processes the second image data DIMG-2 to determine if the next decoded image can be calculated (BLOCK 145). The controller 10 may, for example, determine if a reference frame image data DKF-n is available in the image data IMG-n for the selected imaging device C-n. If the controller 10 determines that the decoded image can be calculated in dependence on the encoded image data DIMG-n of the selected imaging device C-n, the next frame is calculated (BLOCK 150). The controller 10 may, for example, make such a determination if the available encoded image data DIMG-n comprises reference frame image data or the reference frame image data will be available within a predefined time period. The camera service module 20-n generates the viewer image data DVW-n (BLOCK 155). If the necessary data for calculating the decoded image data is not available, for example the reference frame image data will not be available within the predefined time period, the controller 10 accesses the decoded image data calculated for the analytics service module image data DAN-n (BLOCK 160). The decoded image data, calculated for the analytics service module image data DAN-n, are retrieved from a storage device (BLOCK 135) and used to generate the next viewer image data DVW-n (BLOCK 155).

The viewer service module 23 outputs either the analytics service module image data DAN-n or the viewer image data DVW-n to the viewer 24 for display (BLOCK 165). The controller 10 monitors for a command to terminate the viewing of incoming image data from the imaging devices. If such a command is detected the process ends (BLOCK 180). If no command for terminating viewing data is detected, the controller 10 continues to determine whether there is a change in the imaging device C-n selected for output by the user (BLOCK 175). If a change in the selected imaging device C-n is detected, the viewer service module 23 initiates a switch to the selected imaging device C-n (BLOCK 140). If no change in the selected imaging device C-n is detected, the controller continues to determine if the next decoded image can be calculated (BLOCK 145) and continues as explained above.

The storage device 13 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions (e.g. solid state disk (SSD)).

It will be appreciated that various changes and modifications can be made to the present invention without departing from the scope of the present application.

The invention claimed is:

1. A control system for controlling the display of at least first and second images captured by respective first and second imaging devices, the control system comprising one or more controllers, the control system being configured to:
   receive a first data stream comprising first image data corresponding to a first image captured by a first imaging device;
   receive a second data stream comprising second image data corresponding to a second image captured by a second imaging device;
   process the first image data and the second image data to generate first analytics image data and second analytics image data, the first analytics image data corresponding to the first image and the second analytics image data corresponding to the second image;
   receive an input to select the first image device for displaying images;
   processing the first image data to generate first viewer image data corresponding to the first image; and
   output the first viewer image data corresponding to the first image;
   wherein the control system is configured to determine when the second image device instead of the first image device is selected for displaying images; and, in dependence on the determination, to output the second analytics image data before outputting second viewer image data corresponding to the second image.

2. The control system as claimed in claim 1, wherein the control system is configured initially to output the first analytics image data or the second analytics image data corresponding to the selected one of the first image and the second image; and to transition to the output of the selected one of the first viewer image data and the second viewer image data.

3. The control system as claimed in claim 1, wherein the control system is configured to generate the first analytics image data and the second analytics image data by performing a first processing operation of the first image data and the second image data respectively; and to generate the first viewer image data and the second viewer image data by performing a second processing operation of the first image data and the second image data respectively; the first and second processing operations being separate from each other.

4. The control system as claimed in claim 3, wherein the control system is configured to begin outputting the first viewer image data or the second viewer image data corresponding to the selected one of the first image and the second image when the second processing operation is complete.

5. The control system as claimed in claim 1, wherein, when changing from outputting the first image to outputting the second image, the control system is configured to output the second analytics image data and then the second viewer image data.

6. The control system as claimed in claim 1, wherein, when changing from outputting the second image to outputting the first image, the control system is configured to output the first analytics image data and then the first viewer image data.

7. The control system as claimed in claim 1, wherein the control system is configured to analyse at least one of the first analytics image data and the second analytics image data to identify at least one object of interest and/or at least one person of interest.

8. The control system as claimed in claim 1, wherein the control system is configured to generate analytics data in dependence on the analysis of at least one of the first analytics image data and the second analytics image data.

9. The control system as claimed in claim 1, wherein the processor is configured to augment first composite image data with the first analytic image data; and/or to augment second composite image data with the second analytic image data.

10. The control system as claimed in claim 1, wherein the first analytics image data comprises decoded image data; and/or the second analytics image data comprises decoded image data.

11. A surveillance system comprising a control system as claimed in claim 1; and at least first and second imaging devices configured to output first and second data streams to the control system.

12. A method of controlling the display of at least first and second images captured by respective first and second imaging devices, the method comprising:
   receiving a first data stream comprising first image data corresponding to a first image captured by a first imaging device;
receiving a second data stream comprising second image data corresponding to a second image captured by a second imaging device;
   processing the first image data and the second image data to generate first analytics image data and second analytics image data, the first analytics image data corresponding to the first image and the second analytics image data corresponding to the second image;
   receiving an input to select the first image device for displaying images;
   processing the first image data corresponding to the first image; and
   outputting the first viewer image data corresponding to the first image;
   wherein the method comprises determining when the second image device instead of the first image device is selected for displaying images; and, in dependence on the determination, outputting the second analytics image data before outputting second viewer image data corresponding to the second image.

13. The method as claimed in claim 12, further comprising initially outputting the first analytics image data or the second analytics image data corresponding to the selected one of the first image and the second image; and transitioning to the output of the selected one of the first viewer image data and the second viewer image data.

14. The method as claimed in claim 12, further comprising performing a first processing operation of the first image data and the second image data to generate the first analytics image data and the second analytics image data respectively; and performing a second processing operation of the first image data and the second image data to generate the first viewer image data and the second viewer image data respectively; the first and second processing operations being separate from each other.

15. The method as claimed in claim 14, further comprising initiating output of the first viewer image data or the second viewer image data corresponding to the selected one of the first image and the second image when the second processing operation is complete.

16. The method as claimed in claim 12, wherein, when changing from outputting the first image to outputting the second image, the method comprises outputting the second analytics image data followed by the second viewer image data.

17. The method as claimed in claim 12, wherein the method comprises outputting the first analytics image data followed by the first viewer image data when changing from outputting the second image to outputting the first image.

18. The method as claimed in claim 12, further comprising analysing at least one of the first analytics image data and the second analytics image data to identify at least one object of interest and/or at least one person of interest.

19. The method as claimed in claim 12, further comprising generating analytics data in dependence on the analysis of at least one of the first analytics image data and the second analytics image data.

20. The method as claimed in claim 12, further comprising augmenting first composite image data with the first analytic image data; and/or augmenting second composite image data with the second analytic image data.

21. The method as claimed in claim 12, wherein the first analytics image data comprises decoded image data; and the second analytics image data comprises decoded image data.

22. A non-transitory, computer-readable storage medium storing instructions thereon that, when executed by one or more electronic processors, causes the one or more electronic processors to carry out the method of claim 12.

* * * * *